United States Patent [19]
Leonard et al.

[11] 3,725,778
[45] Apr. 3, 1973

[54] TESTING APPARATUS HAVING IMPROVED MEANS FOR MAINTAINING A CONSTANT DENSITY OF MAGNETIC FLUX INDUCED IN A MOVING STRIP OF METAL

[75] Inventors: Stephen C. Leonard, Cheshire; Maurice D. Dilick, Pittsfield, both of Mass.

[73] Assignee: General Electric Company

[22] Filed: July 6, 1971

[21] Appl. No.: 159,849

[52] U.S. Cl. .............................................. 324/34 R
[51] Int. Cl. ........................................... G01r 33/12
[58] Field of Search ................. 324/34 R, 34 TK, 40; 340/173 CA

[56] References Cited

UNITED STATES PATENTS

| 2,951,984 | 9/1960 | Zoltan | 324/34 R |
| 3,172,036 | 3/1965 | Walters | 324/1 |
| 3,281,678 | 10/1966 | Cilyo | 324/34 R |

FOREIGN PATENTS OR APPLICATIONS

| 971,706 | 10/1964 | Great Britain | 324/34 TK |
| 1,135,957 | 9/1962 | Germany | 340/173 CA |

Primary Examiner—Robert J. Corcoran
Attorney—J. Wesley Haubner, Albert S. Richardson, Frank L. Neuhauser, Oscar B. Waddell and Joseph B. Forman

[57] ABSTRACT

A synchronous time delay is provided to assure substantially constant flux density in a moving strip of steel where it passes through a relatively stationary loss measurement guage in a continuous steel tester system. This synchronous delay system utilizes a rotary make-before-break switch with associated signal storage means to transfer a signal representative of the thickness of a section of the moving strip at a first position to control the flux density of the same section at a second position.

3 Claims, 2 Drawing Figures

TESTING APPARATUS HAVING IMPROVED MEANS FOR MAINTAINING A CONSTANT DENSITY OF MAGNETIC FLUX INDUCED IN A MOVING STRIP OF METAL

BACKGROUND OF THE INVENTION

1. Field of the Invention

The present invention relates to analog control systems in which a synchronous time delay is used to assure equal testing conditions at different positions and during different testing or measurement applications along a moving strip of a material such as steel. More particularly, this invention relates to apparatus for automatically maintaining a substantially constant flux density in a moving strip of varying thickness during a loss measurement at a position spaced from a position where a thickness measurement is made.

2. Description of the Prior Art

When measuring and testing several properties of electrical core steel in a continuously moving strip, it is desirous to maintain a constant flux density in that portion of the strip being measured during different measurements.

Prior art attempts to delay a control signal to approximate the flux density in steel testing operations was through digital recorders. The disadvantage with digital recorders was that the outputs from the digital recorders would be discrete spiked waveforms and not analog waveforms.

The automatic flux density control of this invention provides a smooth, continuous control function between a thickness gauge and a loss measurement gauge in a continuous strip tester. This smooth control function avoids the prior art problem of generating step functions in control systems.

SUMMARY OF THE INVENTION

The apparatus for producing corresponding flux densities in a moving strip of varying thickness is applicable in the environment of a continuous strip tester comprising a saturation thickness gauge and a loss measurement gauge.

Since the saturation thickness gauge and the loss measuring gauge cannot be located at the same position along the moving strip of steel, means for delaying the measurement of thickness of cross-sectional area is required since the output from the saturation thickness gauge will be required at the time the same section of the strip is centered in the loss measurement gauge. Therefore, the time delay may be synchronized with the moving strip of steel. This synchronization is necessary since that section of the strip of which the cross-sectional area is measured must be the same section of the strip that is centered in the loss measurement gauge at the time the loss measurement is made.

In operation, the voltage output from the saturation thickness gauge is rectified to produce a first signal. This first signal represents the cross-sectional area or thickness of the section of the section of the steel strip that is passing the center of the saturation thickness gauge at any moment. This first signal is fed to a series of rotating capacitors or to rotating contacts which are in turn connected to capacitors. These capacitors are charged to a level of voltage representing the cross-sectional area of the steel strip.

The first signal is delayed in the rotating capacitors for a period of time, approximating the time it takes for substantially the same section of the moving steel strip to move from the center of the saturation thickness gauge to the center of the loss measurement gauge. This time corresponds substantially to the time that a signal storage means or capacitor is switched between the input and the output contacts of the rotary make-before-break switch.

The rotary make-before-break switch utilized in this invention comprises an input contact, an output contact and signal storage means. Each signal storage means has a first and second connecting contact. The first connecting contacts of the rotary make-before-break switch are coupled mechanically or otherwise to drive rolls which drive the strip through both the saturation thickness gauge and the loss measurement gauge.

The voltage induced in a coil of the loss measurement gauge is fed through a buffer amplifier and through a rectifier to produce a DC voltage or second signal at the output of the rectifier. This second signal corresponds to the level of voltage sensed in the loss measurement gauge, and is fed into a differential amplifier wherein it is compared to the first signal obtained from the saturation thickness gauge.

The voltage output of the differential amplifier will detect any difference between the delayed first signal and the second signal and will control the excitation level of the magnetizing winding at the loss measuring gauge to minimize such difference. This is accomplished by controlling the gain of a power amplifier through an electronic gain control. The gain is varied as necessary to adjust the flux in the loss measurement gauge to a level that maintains the flux density substantially constant, as indicated by correspondence between the second signal and the delayed first signal.

It is therefore an object of this invention to provide means to delay a first signal which is proportional to the cross-sectional area or thickness of a steel strip for a period of time determined by the ratio of the distance separating a saturation thickness gauge and a loss measurement gauge to the speed of the strip. The first signal is compared with a second signal to control the flux density of the strip at a second position in the loss measurement gauge.

It is a further object of this invention to provide a rotatable make-before-break type of apparatus discharged through a predetermined impedance, to provide an analog output, delayed in time, and proportional to the cross-sectional area of a strip of moving steel for the purpose of synchronizing steel measurements.

A further object of this invention is to provide a rotatable make-before-break switch coupled to a high impedance discharge path to reduce any step functions in a control system.

It is another object of this invention to maintain a constant flux density in a portion of a strip being measured during two separate in time and distance operations.

Other objects and advantages of the invention will become apparent to those skilled in he art upon reading the specification in conjunction with the drawings.

Briefly stated, in accordance with one aspect of the invention, the foregoing objects are achieved by providing a rotatable make-before-break switch with a plurality of signal storage means. These signal storage means retain a first signal proportional to the cross-sectional area or thickness, as determined in the saturation thickness gauge, for a predetermined length of time. The retained first signal is compared with a second signal, said second signal being representative of the flux lines in said steel strip at the loss measurement gauge at a second position, and any difference between the signals is used to control the excitation of a magnetizing winding of the loss measuring gauge which controls the flux density at the second position in the loss measuring gauge. This control is achieved when the substantially same section of the strip that was contained in the thickness gauge at a first position is now in the loss measurement gauge.

DESCRIPTION OF A PREFERRED EMBODIMENT

Figure 1:
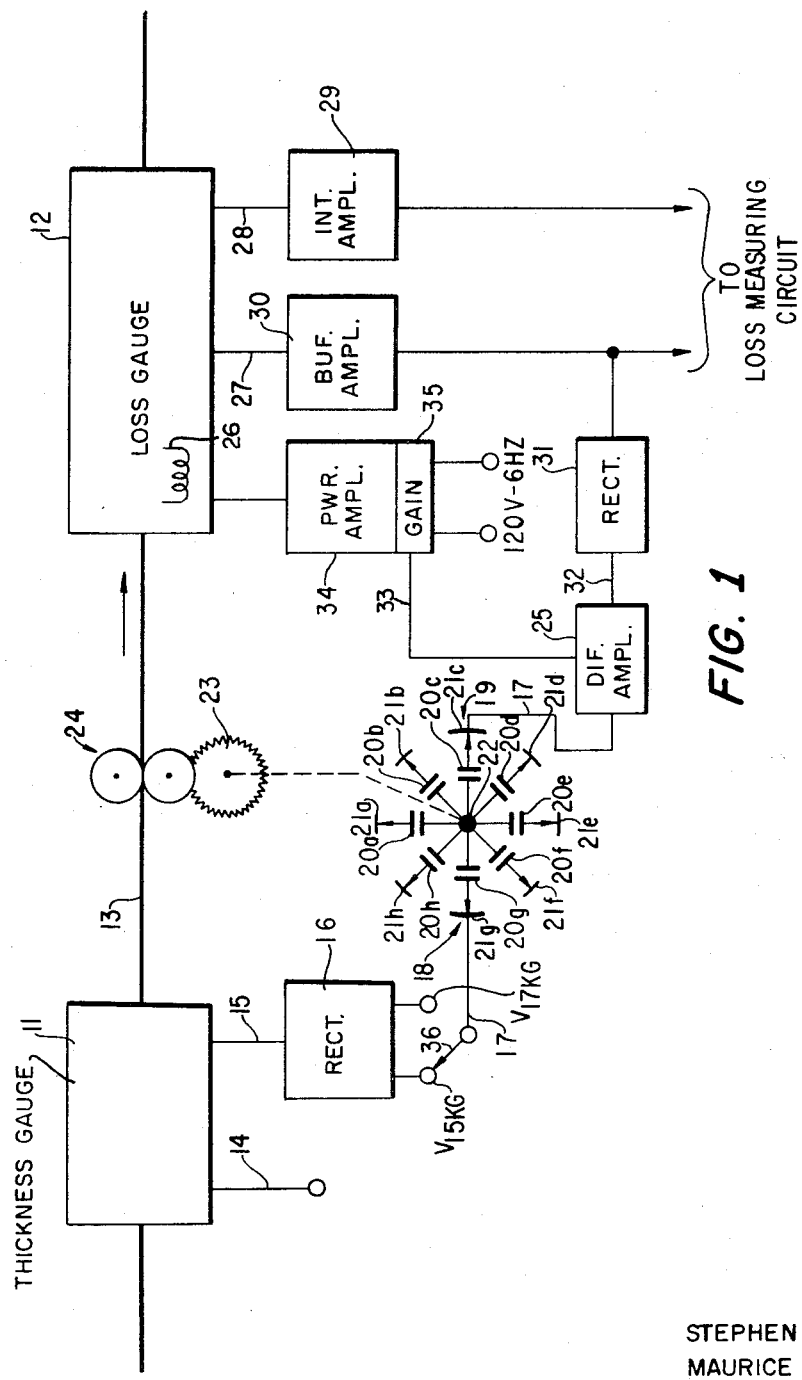
FIG. 1 is a diagrammatic illustration of the novel automatic flux density control in the environment of a saturation thickness gauge and a loss measuring gauge in a continuous strip tester.

Referring to FIG. 1, the automatic flux density control of the present invention is illustrated as part of apparatus for continuously testing a moving strip 13 having magnetic properties while the strip moves longitudinally along a predetermined path. The strip may for example be electrical core steel. The testing apparatus includes a loss measurement gauge 12 disposed at a relatively stationary position along the path of the strip 13. For loss measurement purposes, it is desired to maintain a substantially constant flux density in the portion of the moving strip passing through the gauge 12. Toward this end, a saturation thickness gauge 11 capable of measuring the cross-sectional area of the moving strip 13 is disposed adjacent the path of the strip at a predetermined position in advance of the loss measurement gauge 12. Preferably the saturation thickness gauge 11, is constructed in accordance with the subject matter of a copending application Ser. No. 159,940, filed on July 6, 1971, invented by Stephen C. Leonard, and a loss measurement gauge 12 utilizes the construction disclosed in U.S. Pat. No. 2,861,241, issued Nov. 18, 1958, to Stephen C. Leonard, Robert L. Ten Broeck, and Lewis R. Runaldue; both the co-pending application and the patent supra are assigned to the assignee of the present application.

The saturation thickness gauge 11, at its position in advance of the gauge 12, determines the cross-sectional area of the moving strip 13, as the strip is driven by drive rolls 24 along a conveyor (not shown). Substantially the same section of the strip measured in the saturation thickness gauge 11 at the first position is measured at a second position in the loss measurement gauge 12 for loss characteristics.

The saturation thickness gauge 11 is provided with a magnetizing winding (not shown) which is disposed about the core lamination or strip of electric core steel 13 and is energized by a constant frequency alternating current source 14 to produce sufficient magnetizing force (ampere turns per inch or oersteds) to saturate the moving strip centrally therein. An AC voltage 15 induced in a pickup coil (not shown) is consequentially proportional to the cross-sectional area of the strip of steel 13 as indicated in the co-pending application supra. In that the cross-sectional area is equal to the width multiplied by the thickness of the strip, the induced voltage 15 is also proportional to the thickness of the steel strip 13 when the width is held constant. The output voltage 15 is rectified in rectifier 16, producing a DC voltage output or first signal 17 whose magnitude is directly proportional to the measured area. This first signal 17 represents the cross-sectional area or thickness of the section of the steel strip that is passing the center of the saturation thickness at any moment and is connected to an input contact 18 of a rotary make-before-break switch.

The rotary make-before-break switch, which avoids a sharp step function type of control, comprises the input contact 18, an output contact or terminal 19, and a plurality of signal storage means 20a through 20h. One end of each of the signal storage means is connected to a first connecting contact designated 21a through 21h respectively, and the other end of each said signal storage means is connected to a common potential point 22. The first connecting contacts of the rotary make-before-break switch are operative in sequence to sample the magnitude of the first signal 17, whereby the low leakage capacitors 20a through 20h are respectively charged during periodical intervals to a level of voltage representative of the cross-sectional area of the strip 13. The contacts are mechanically geared through gear cluster 23 to drive rolls 24 which may cooperate with a conveyor (not shown) so that the rotary switch is driven in synchronism with the movement of the strip 13. The ratio of the drive rolls 24 is selected so that each first connecting contact 21a–h revolves from the time of acquiring the first signal 17 from the output of the saturation thickness gauge 11 at the input contact 18 to the time of delivering the stored signal to the output contact 19 in a predetermined length of time substantially corresponding to the time that elapsed while the same section of the moving strip of steel 13 moves from the center of the saturation thickness gauge 11, at a first position, to the center of the loss measurement gauge 12 at a second position.

When a section which was measured at a first position in the saturation thickness gauge 11 is centered in the loss measurement gauge 12 at a second position, the appropriate first connecting contact 21a – 21h will be received by output contact 19. The DC voltage, or first signal 17, is impressed at the input of a differential amplifier 25. The differential amplifier 25 preferably should have a high input impedance to the incoming first signal 17. To produce sufficiently high impedance to the first signal 17, after being received by output contact 19, an emitter follower (not shown) or other high impedance apparatus may be used to avoid the rapid discharging of the sensed storage means 20. This results in a first signal 17 corresponding to the cross-sectional area or thickness of the strip 13 is available in the proper time sequence for automatically controlling the flux density during a loss measurement. That is, the first signal 17 representative of the cross-sectional area or thickness of the strip of steel at a first position in the saturation thickness gauge 11 is available to control the flux density of the strip 13 in the loss measurement gauge 12 at a second position when substantially the same section of the strip 13 is centered in the loss measuring gauge 12.

The loss measuring gauge 12 which may be of the type described in U.S. Pat. No. 2,861,241, referred to hereinbefore, teaches a magnetizing coil or M coil designated by the reference numeral 26 in the present invention, a B coil (not shown), and an H coil (also not shown). The M coil 26 is supplied with a current, to induce flux in the portion of the moving strip of steel located in the loss measurement gauge 12. A voltage induced in the H coil designated by the reference numeral 28 herein is applied through a buffer and integrating amplifier 29 along with the B coil voltage 27 which is applied through a buffer amplifier 30 to coils of loss measuring circuit (not shown), well known in the art.

The flux voltage 27 induced in the B coil of the loss measuring gauge 12 is fed through a buffer amplifier 30, and then through a rectifier 31 to form a second signal 32 which is representative of the flux level in the portion of the strip 13 located in the gauge 12. This signal is applied to a second input of a differential amplifier 25. The differential amplifier 25 senses the magnitude difference between the delayed signal 17 at the output terminal 19 and the second signal 32 and uses the resulting difference signal 33 at the output of differential amplifier 25 to control the excitation level of a power amplifier 34 which drives the M coil 26 of the loss measurement gauge 12. The gain of the power amplifier 34 is varied through an electronic gain control 35 connected to the output of the differential amplifier 25 so as to adjust the flux level in the gauge 12 as necessary to maintain a substantially constant ratio of flux to area in the portion of the strip 13 passing through this gauge.

When the second signal 32 is equal to the delayed first signal 17, the flux of the strip 13 in the loss measurement gauge 12 is at the level of flux being called for by the first signal 17 of the saturation thickness gauge 11, and consequently a desired constant flux density is maintained in the portion of the strip whose loss is being measured.

A selector switch 36 is provided at the output of the rectifier 16 to allow the selection of the proportionality constant that relates the magnitude of the first signal 17 to the actual area of the cross section being measured by the gauge 11, and this in turn determines the value of flux density, either 15 or 17 kilogauss, that is maintained in the loss measurement gauge 12.

Figure 2:
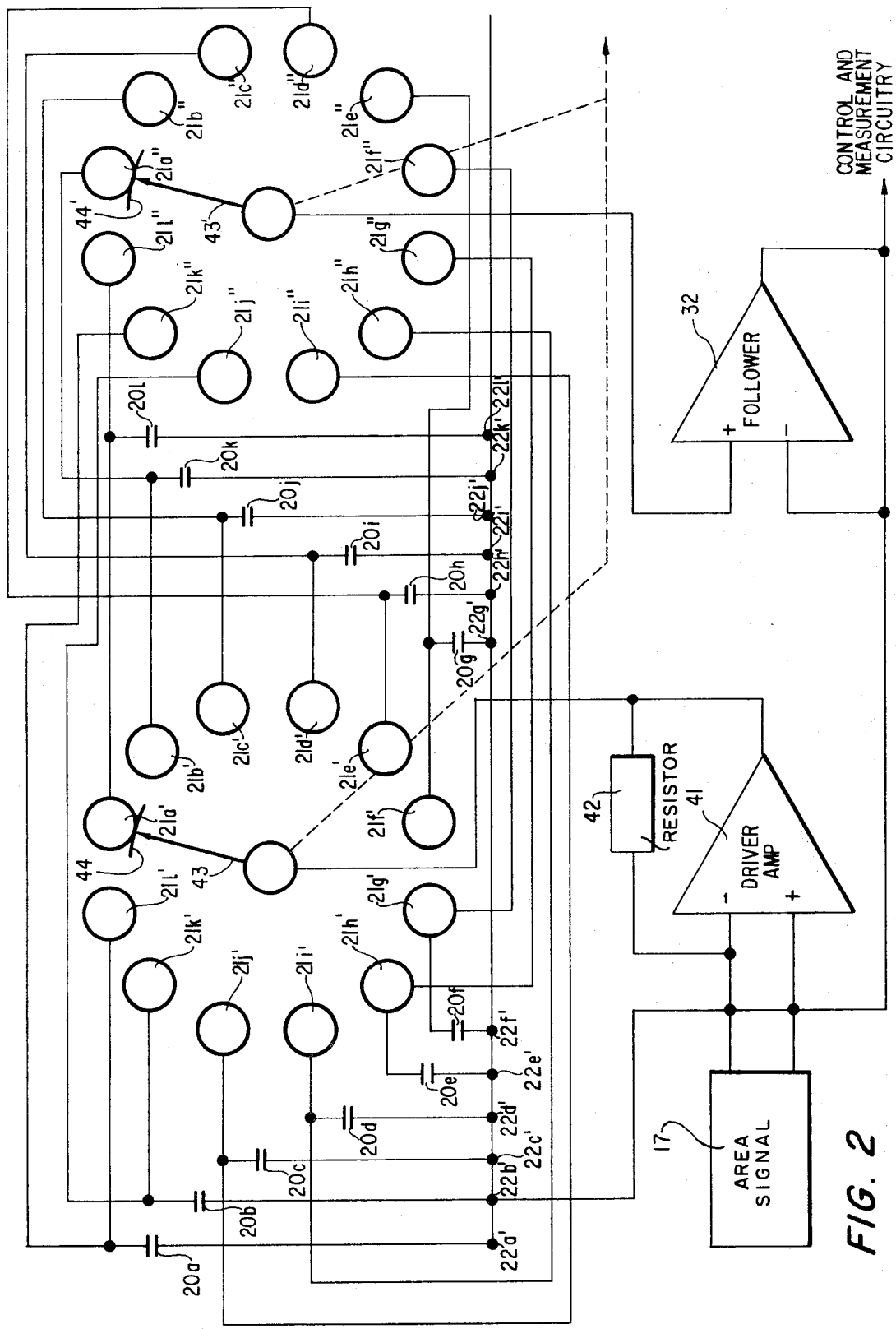
FIG. 2 is a schematic representation of a rotatable make-before-break switch.

Referring to FIG. 2, a schematic representation the input and output of a typical rotatable make-before-break switch is shown. The input of the switch is driven by a driver amplifier 41 with its associated feedback resistance 42 connected thereacross. The first connecting contacts designated 21a' through 21L' are sequentially connected in a clockwise direction by wiper arm 43. Wiper arm 43 is provided with a head 44 which will allow the next successive first connecting contact to be made before the former connecting contact is broken. With this arrangement the magnitude of the area signal 17 is periodically sampled during successive intervals that overlap one another, whereby each sampling interval in turn commences before the end of the preceding sampling interval. In FIG. 2 the first connecting contacts are connected to one end of a plurality of capacitors designated 20a through 20L which respectively store signals corresponding to the sequentially sampled magnitudes. The other ends of the signal storage means designated contacts 22a' through 22L' are connected at a common potential point.

On the output side of the make-before-break switch, first connecting contacts 21a'' through 21l'' are caused to be successively connected and disconnected in a make-before-break fashion by wiper arm 43' with its associated head 44'. Wiper arms 43 and 43' are coupled appropriately to drive rolls for strip 13 to provide synchronization with the moving strip of steel 13. The output of the rotary make-before-break switch is connected to an emitter follower 32 or other high impedance device prior to its connection to differenial amplifier 25. With this arrangement the respective signals which are sequentially stored in the capacitors 20a through 20L are delivered to the follower 32 in overlapping fashion, whereby the follower is continuously energized by a succession of stored signals without any gaps or step changes therein.

The means for rotating the first connecting contact 21 is meant to encompass any situation in which the first connecting contact 21 or the signal storage means 20 rotate in synchronization with the movement of the steel strip. Likewise, said means for rotating said first connecting contact 21 will encompass any situation in which a wiper arm 43 or other switching means is utilized to form a rotary make-before-break switch which is in synchronization with the movement of the steel strip 13.

While various uses of the invention have been shown and described, it will be apparent to those skilled in the art that many modifications are possible, without departing from the present invention. The invention, therefore, is not to be restricted except insofar as is necessary by the prior art and by the spirit of the appended claims.

We claim:

1. In apparatus for continuously testing a moving strip having magnetic properties while the strip moves longitudinally through a gauge disposed along its path of movement, improved means for automatically maintaining a substantially constant flux density in the portion of the moving strip passing through said gauge, comprising:

a. means adjacent said path for measuring the area of the cross section of said moving strip at a predetermined position in advance of said gauge and for producing a first signal whose magnitude is directly proportional to the measured area;

b. rotary storage means comprising a plurality of means operative in sequence for sampling the magnitude of said first signal during periodic intervals, storing a signal of corresponding magnitude, and after a predetermined length of time delivering the stored signal to an output terminal;

c. means for driving said storage means in synchronism with the movement of said strip so that said predetermined length of time corresponds to the time that elapses while a section of said strip moves from said predetermined position to said gauge;
d. controllable magnetizing means for inducing flux in the portion of the strip located in said gauge;
e. means associated with said gauge for producing a second signal representative of the flux level in the portion of said strip located therein; and
f. means responsive to the difference between the magnitude of the signal at the output terminal of said storage means and the magnitude of said second signal for controlling said magnetizing means so as to adjust the flux level as necessary to maintain a substantially constant ratio of flux to area in said portion of said strip.

2. The improvement of claim 1 wherein the sequentially operative means of said rotary storage means are constructed and arranged so that successive sampling intervals overlap one another, whereby each sampling interval in turn commences before the end of the preceding sampling interval.

3. The improvement of claim 1 wherein said rotary storage means includes a make-before-break switch which is arranged to deliver the sequentially stored signals to said output terminal in an overlapping fashion, whereby the output terminal is continuously energized by a succession of stored signals.

* * * * *